United States Patent

[11] 3,620,307

| [72] | Inventor | Antone Vilela<br>R.R. #1, Box 293A, Kapaa, Kauai, Hawaii 96746 |
|---|---|---|
| [21] | Appl. No. | 865,815 |
| [22] | Filed | Oct. 13, 1969 |
| [45] | Patented | Nov. 16, 1971 |

[54] GOLF COURSE GREEN OR YARD BORDER CUTTER
2 Claims, 5 Drawing Figs.

[52] U.S. Cl. ..................................... 172/15,
172/17, 172/43, 172/430, 56/256
[51] Int. Cl. ....................................... A01b 45/00
[50] Field of Search ............................ 172/13, 14,
15, 16, 17, 18, 41, 42, 43, 430; 56/25.4

[56] References Cited
UNITED STATES PATENTS

| 2,630,747 | 3/1953 | Mintz | 172/15 |
|---|---|---|---|
| 2,664,807 | 1/1954 | Hedrick | 172/42 |
| 2,673,725 | 3/1954 | Coates | 56/25.4 |
| 2,680,945 | 6/1954 | Reed | 172/14 |
| 2,791,875 | 5/1957 | Faas | 172/14 |
| 3,004,355 | 10/1961 | Julian | 172/430 |

FOREIGN PATENTS

| 793,568 | 4/1958 | Great Britain | 172/15 |
|---|---|---|---|
| 471,114 | 1/1951 | Canada | 56/25.4 |

*Primary Examiner*—Robert E. Pulfrey
*Assistant Examiner*—C. W. Hanor

ABSTRACT: An improved lawn edger used particularly for edging a golf course green, the device comprising a wheel mounted chassis carrying an engine driving a cutting blade, and the chassis carrying a cutting-line guide which is in alignment taken by the path of the cutting blade.

INVENTOR
Antone Vilela

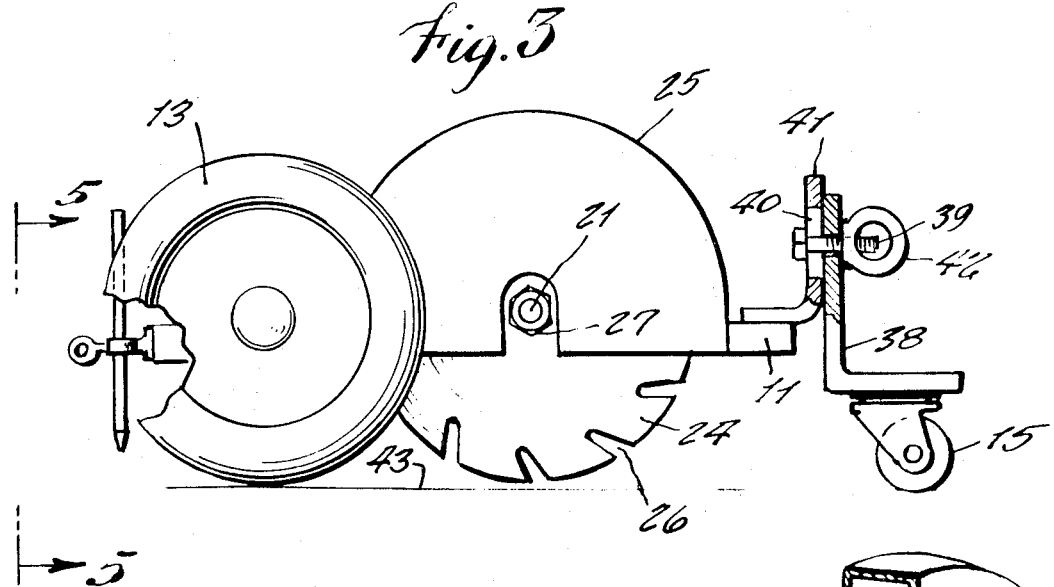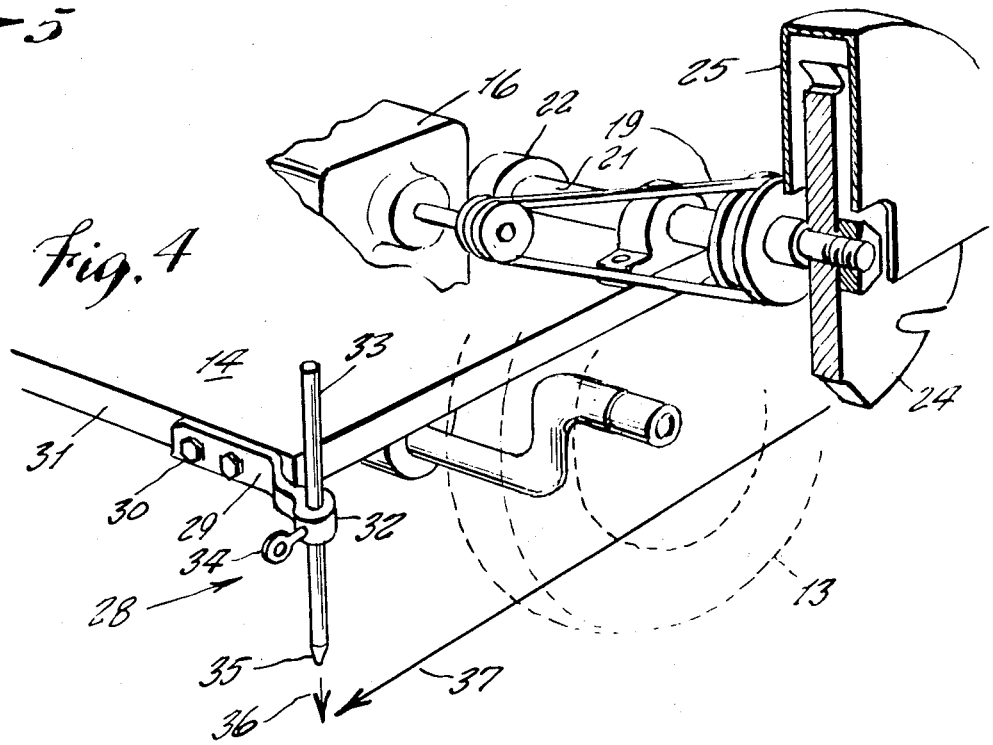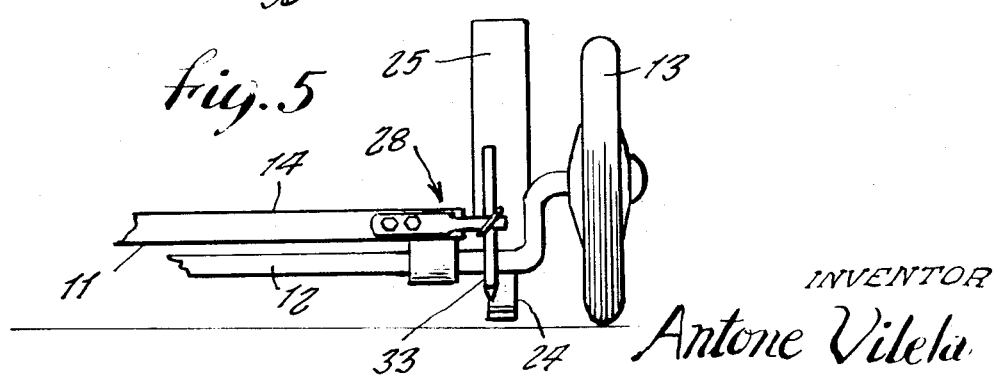

GOLF COURSE GREEN OR YARD BORDER CUTTER

This invention relates generally to lawn edgers.

It is generally well known to those skilled in the art that all golf courses have greens. These greens are sown with a special type of grass that is different from the remaining grass upon the golf course. It is necessary to periodically cut a border so to separate the common grass from the special grass of the greens.

Heretofore such operation has taken considerable time resulting in heavy labor cost. This has been objectionable and accordingly in want of improvement.

Accordingly it is the principle object of the present invention to provide a golf course green or yard border cutter which can cut a border so to separate the common grass and the special grass of a greens of a golf course and which will accomplish the sames in a relatively short time thus saving on labor costs.

Another object of the present invention is to provide a golf course green or yard border cutter which is readily adaptable for use also as a lawn edger for a conventional home lawn.

Other objects of the present invention are to provide a golf course green or yard border cutter which is simple in design, inexpensive to manufacture, rugged in construction, easy to use and efficient in operation.

These and other objects will become readily evident upon a study of the following specifications and the accompanying drawings wherein:

FIG. 3 is an enlarged fragmentary side elevation view of the structure shown in FIG. 1, FIG. 4 is a fragmentary perspective view showing the relationship of a cutting line guide, and FIG. 5 is a fragmentary front elevation view thereof.

Figure 1:
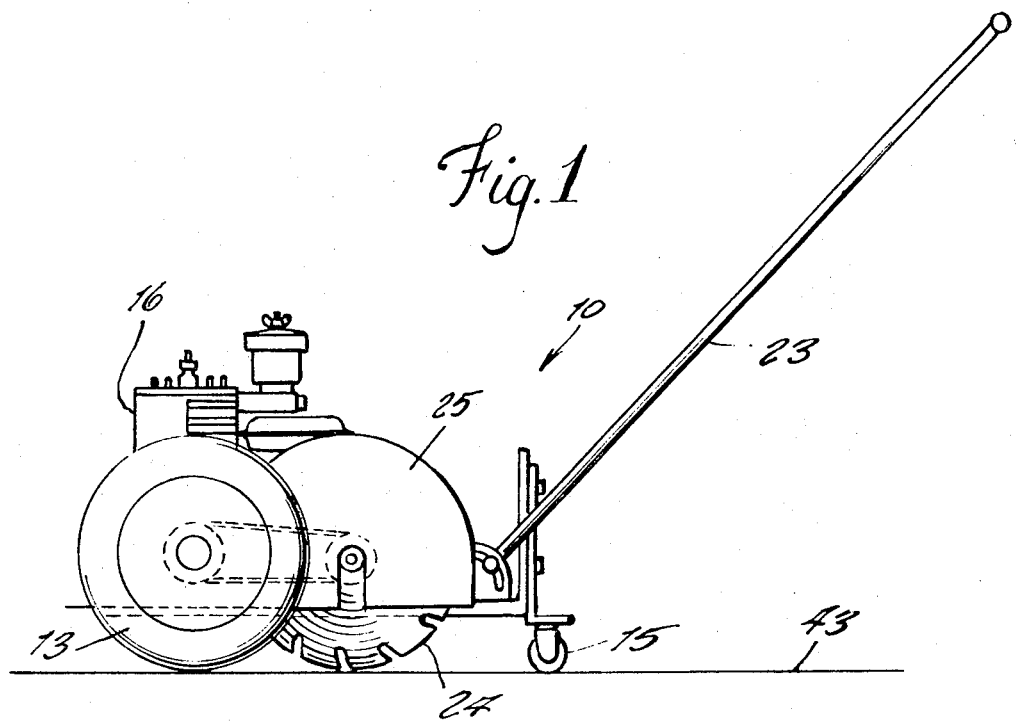
FIG. 1 is a side elevation view of the present invention.
Figure 2:
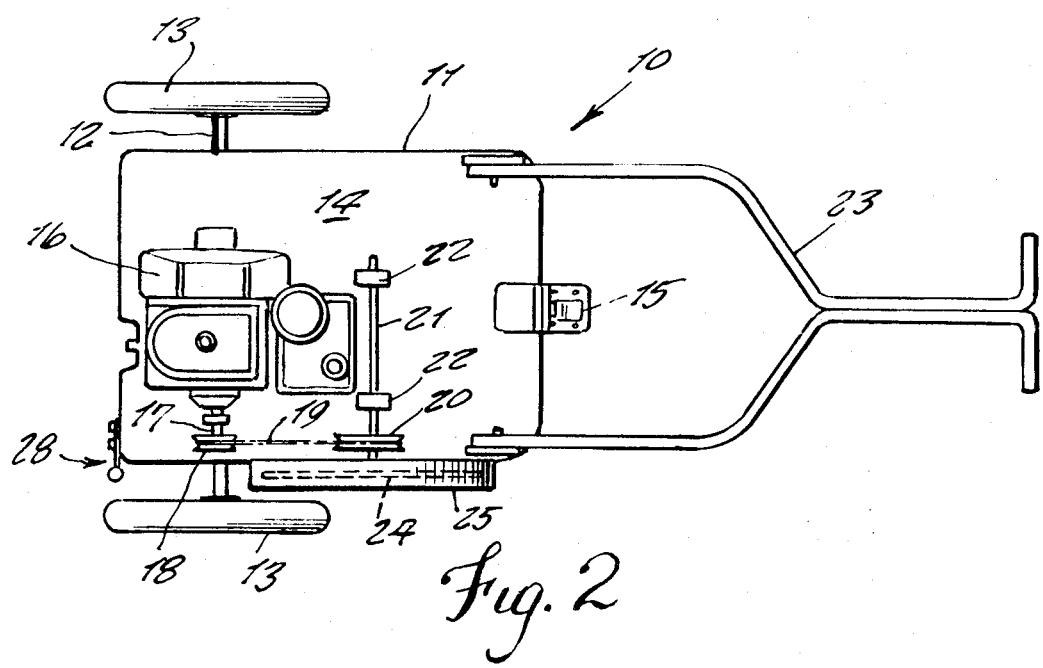
FIG. 2 is a top plan view thereof.

Referring now to the drawing in detail, and more particularly to FIG. 1 and 2 of the drawings at this time, the reference numeral 10 represents a golf course green or yard border cutter according to the present invention wherein there is a chassis 11 supported at its front end upon a transverse extending axle 12 having a rubber-tired wheel 13 upon each end thereof and positioned adjacent each side of a chassis platform 14. The rear end of the chassis 11 is supported upon a swiveling wheel 15 that is vertically adjustable.

A Briggs and Stratton engine 16 of conventional lawnmower-type is mounted upon the platform 14, the engine having an output shaft 17 having a pulley 18 mounted thereupon, the pulley 18 being connected by an endless belt 19 to a pulley 20 on a shaft 21 supported within bearings 22 from the platform 14.

A rearwardly extending handle 23 is connected to the chassis 11 in a conventional manner so as to be guided by an operator walking behind the machine. The handle 23 may carry conventional controls leading to the engine 16 such as are well known in lawnmowers, if desired.

Said controls may comprise a clutch between the engine and power to the shaft 12, and may also include a speed adjustment for the engine.

In the present invention, shown more particularly in FIGS. 3 to 5, the present device includes a cutting blade 24 of the type used in power circular saws, the cutting blade 24 being mounted upon one end of the shaft 21 and being located along one side of the chassis. The cutting blade 24 is enclosed upon its upper side beneath a hood 25 so as to prevent accidental contact therewith by the operator.

The cutting blade 24 is provided with a plurality of inclined notches 26 in the peripheral rim thereof, as shown. A nut 27 on the end of shaft 21 secures the cutting wheel or cutting blade in position.

The chassis 11 also supports a cutting-line guide 28 upon a forward end thereof, the cutting-line guide comprising a bracket 29 secured by bolts 30 to a front edge 31 of the platform 14, the bracket 29 incorporating a collar 32 through which there is positioned a vertically extending pin 33, the pin 33 being selectively secured within the collar 32 by means of a thumbscrew 34. The lower end of the pin 33 can be conically tapered toward a rounded point, as shown in FIG. 4 at 35.

As shown in FIGS. 4 and 5 of the drawing, the cutting-line guide pin 33 is located directly in alignment forwardly of the cutting blade 24. This is graphically indicated by the arrows 36 and 37 which converge along a directly forward and vertical plane.

The swiveling wheel 15 is secured adjustably relative to the chassis 11 so that the rear portion of the chassis may be raised or lowered and thus bring the cutting blade relatively further or closer toward a ground level.

As shown in FIG. 3, the swiveling wheel 15 is mounted on the underside of an L-shaped bracket 38 which at its upper end receives a horizontally extending bolt 39 therethrough, the bolt being passed through a vertically extending slot 40 in an L-shaped bracket 41 stationarily affixed upon a rear end of the chassis 11. The bolt is secured by means of a wingnut 42.

In operative use, in order to raise or lower the cutting blade, the wingnut 42 is loosened so as to allow the bolt 39 to be repositioned vertically along the slot 40 of bracket 41 after which the wingnut 42 is again secured. Thus the lower edge of the cutting blade can be controlled respective to a ground line 43.

In order to cut a border to separate the common grass of a golf course from the special grass of the green, the operator walking behind the machine looks forwardly to the bottom end of the pin 33 of the cutting-line guide, the lower end of the pin indicating to the operator the path that will be taken by the cutting blade. The pin can be selectively controlled upwardly or downwardly as desired by means of the wing screw 34.

Thus there has been provided a golf course green or yard border cutter for cutting a separating border in a relatively quick time and thus save on labor costs.

What I now claim is:

1. In a golf course green or yard border cutter, the combination of a chassis, a front end of said chassis being supported upon a transverse extending axle, said axle being mounted at its opposite ends upon a pair of rubber-tired wheels, said chassis having a platform thereupon, each said rubber-tired wheel being positioned along a side of said platform, a rear end of said chassis being supported vertically adjustably upon a swiveling wheel and a rearwardly extending handle secured to said chassis for being controlled by an operator walking there behind, said chassis carrying a cutting blade for cutting a border to separate a common grass from a special grass of a golf green, said platform having a Briggs and Stratton engine providing power means for rotation of said cutting blade, said engine including an output shaft having a pulley mounted thereupon, said pulley being connected by and endless belt to a second pulley mounted upon a shaft supported rotatably free within a bearing block mounted upon said platform, said shaft having said cutting blade mounted thereupon and secured thereto by means of a nut, said cutting blade being positioned alongside said platform and being enclosed within its upper side by a protective hood carried by said chassis, said cutting blade being rotatable about an axis extending transversely to a forward travel, a cutting-line guide being mounted upon a forward end of said chassis, said cutting-line guide comprising a bracket secured to said platform and at a corner thereof, said bracket including a collar supporting a vertically extending pin, said pin being selectively secured within said collar by means of a wing screw, a lower end of said pin being downwardly tapered toward a rounded point, and said pin being in direct forward alignment with said cutting blade.

2. The combination as set forth in claim 1, wherein said swiveling wheel is mounted beneath an L-shaped bracket, said L-shaped bracket receiving a horizontally extending bolt therethrough, said bolt being received through a vertically extending slot of an L-shaped bracket stationarily mounted on a rear portion of said chassis, and said bolt receiving a wingnut for securing said L-shaped brackets together in a selected vertical relationship toward each other.

* * * * *